United States Patent [19]

Avsan et al.

[11] 4,222,101

[45] Sep. 9, 1980

[54] ARRANGEMENT FOR BRANCHING AN INFORMATION FLOW

[75] Inventors: Oleg Avsan; Nils Karl Isaksson, both of Huddinge, Sweden

[73] Assignee: Telefonaktiebolaget L M Ericsson, Stockholm, Sweden

[21] Appl. No.: 892,494

[22] Filed: Apr. 3, 1978

[30] Foreign Application Priority Data

Apr. 26, 1977 [SE] Sweden ............................. 7704787

[51] Int. Cl.² .............................................. G06F 7/28
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,609,700 | 9/1971 | Wollum | 364/200 |
| 3,717,850 | 2/1973 | Ghiron | 364/200 |
| 3,771,138 | 11/1973 | Celtruda | 364/200 |
| 4,025,771 | 5/1977 | Lynch, Jr. | 364/200 |

Primary Examiner—Gareth D. Shaw
Assistant Examiner—David Y. Eng
Attorney, Agent, or Firm—Hane, Roberts, Spiecens & Cohen

[57] ABSTRACT

Digital words of a pipelined incoming information flow are branched into a number of outgoing information flow branches. The term "pipelined" means that the flow is transferred through memory means whose activation inputs are controlled by clock pulses, the memory means arranged successively with reference to the flow direction being coincidently activated to receive successive words of the flow. A digital branching information flow for ordering into which of the outgoing branches the incoming words have to be branched is generated in step with the incoming flow. The basis for each outgoing branch is obtained from the output of a branching register to which the incoming flow is supplied. The branching registers are activated by the clock pulses, but if an outgoing branch contains only a part of the incoming flow, an activation locking device is used in order to block the clock pulses in dependence on the respective branching information. The branching information flow may be transferred to the locking devices through branching information registers whose activation inputs may also be controlled by locking devices. A branching information register is, however, not to be controlled by the locking device connected to its own output.

1 Claim, 3 Drawing Figures

Fig. 2

| IFG1 | IFG2 | | | BIR1 | BIR2 | B1 | B2 | B3 | B4 |
|---|---|---|---|---|---|---|---|---|---|
| | bi1 | bi2 | bi3 | | | | | | |
| 10 | 1 | 0 | 1 | 1 | 1 | | | | |
| 11 | 1 | 0 | 1 | 1 | 0 | 10 | 10 | 10 | 10 |
| 12 | 0 | 1 | 0 | 1 | 0 | 11 | 11 | 10 | 11 |
| 13 | 0 | X | 0 | 0 | 1 | 12 | 12 | 10 | 11 |
| 14 | 0 | X | 0 | 0 | 1 | 13 | 12 | 13 | 11 |
| 15 | 0 | X | 1 | 0 | 1 | 14 | 12 | 14 | 11 |
| 16 | 1 | X | 1 | 0 | 1 | 15 | 12 | 15 | 15 |
| 17 | 1 | 0 | 0 | 1 | 1 | 16 | 12 | 16 | 16 |
| 18 | | 1 | 0 | 1 | 0 | 17 | 17 | 17 | 16 |
| 19 | | | | | 1 | 18 | 18 | 17 | 16 |

Fig. 4

| AR | B5 | BIP1 | BIP2 | B6 | BA | C1 | C2 |
|---|---|---|---|---|---|---|---|
| 46 | | 1 | X | | | 0 | 0 |
| 47 | (46) | 0 | X | (46) | X | 1 | 0 |
| 20 | (47) | 1 | X | (46) | X | 0 | 0 |
| 21 | X | 0 | X | (20) | X | 0 | 0 |
| 22 | (21) | 1 | X | (20) | X | 0 | 0 |
| 23 | X | 0 | 1 | (22) | X | 0 | 0 |
| 24 | (23) | 1 | 1 | (22) | 90 | 0 | 1 |
| 90 | (24) | 1 | 0 | X | 26 | 0 | 0 |
| 91 | X | 0 | 0 | (90) | 26 | 0 | 0 |
| 92 | 91 | 0 | 0 | (90) | 26 | 0 | 0 |
| 93 | (92) | 0 | 0 | (90) | 26 | 0 | 0 |
| 94 | (93) | 1 | 0 | (90) | 26 | 0 | 0 |
| 95 | (94) | 0 | 0 | (94) | 26 | 0 | 1 |
| 26 | (95) | 1 | 0 | (94) | 26 | 0 | 0 |
| 27 | (26) | 1 | X | X | 26 | 0 | 0 |
| 28 | X | 0 | X | (27) | X | 0 | 0 |
| 29 | (28) | 0 | X | (27) | X | 1 | 0 |
| 50 | (29) | 1 | X | (27) | X | 0 | 0 |

ARRANGEMENT FOR BRANCHING AN INFORMATION FLOW

BACKGROUND OF THE INVENTION

The present invention refers to an arrangement for branching, to outgoing information flow branches, an incoming information flow of digital words which are used in a stored program controlled telecommunication system. The words are divided into groups of bits and generated by means of a first information flow generator at a rate which is obtained by means of clock pulses transmitted from a clock pulse source. The information flow is transferred between memory means whose activation inputs are controlled by the clock pulses such that successively arranged memory means in the transfer direction are activated simultaneously to receive successive information included in respective flow. Such an information transfer principle is generally known, for example from an article "Large Scale Systems Architectures" by J. R. Douglas, which in a "Report 23" was published in 1975 by Infotech, England, and which is called a "pipeline" principle.

If, for example, a read-only-random-access-memory is run according to such pipeline principle, such memory comprising an address register to hold one address at a time, a number of addressable memory element groups to store digital words and a word register to hold a word which is read from the memory element groups by means of the associated address, the following state is obtained shortly before one of the clock pulses activates the activation inputs of the addesss register and the word register. An incoming address waits at the information input of the address register. The address register stores that address which just before the first previous clock pulse had waited at the information input. The address then in the address register has activated the associated memory element group for reading so that the associated digital word waits at the information input of the word register. The word register stores the word which has been read in response to such previous clock pulse. The registered word activates the information output of the word register. By means of each clock pulse, according to the pipeline principle, a new address is "pumped" into the address register and a new read word is "pumped" into the word register. Each processing of a unit of information (according to the example an address flow causing a a word flow) included in an information flow, is carried out between two storage means successively arranged in the transfer direction (the address register and the word register according to the present embodiment) and controlled by means of the clock pulse source, requires one period between two successive clock pulses. Such a timing period is needed also if the flow processing only comprises a transfer of an otherwise unprocessed unit of information from the one to the other memory means.

When processing digital information by means of a computer which controls for example a telecommunication system, both this branching of an information flow into a number of flow branches and the information flows resulting from a convergence of a number of flow branches occur. The execution of instructions and arithmetic operations can be mentioned as examples of flow branching and flow converging respectively. The present invention, however, only treats flow branchings by means of "pipeline" organized memory means. The clock pulse frequency is determined with regard to the transit times of the conductors and to the reaction times of the memory means and interarranged information processing devices, so that the information will be reliably "pumped" through the flow branches of the stored program controlled system. An effective "pipeline" control demands a computer in which the flow speed, the length of the information words (i.e. the number of bits in the digital words) and the branching structure are well adjusted to each other.

It is known, when performing an instruction sequence which is read from an instruction memory, to divide each instruction word into an operation field respective, a format field and a variable field. By decoding the operation field direct orders are obtained as to how the variable field shall be used, one or several flow branches being allocated besides the decoder branch. If the pipeline principle is used each information processing between two pipeline activation points requires one timing period, as has been described already. Accordingly, there is no profit utilizing long instruction words containing lots of information, which are read from the instruction memory one per timing period, if the branching process then uses up more than one period during which the successive instruction is not allowed to be transferred to the branching arrangement. It is known to solve such data processing problems either by having an overlap upon the performance of successively read instructions or parts of an instruction (if the control process itself allows such overlap) or by buffer-storing result information (if the control process does not allow an immediate overlap). The mentioned problem in connection with the use of the pipeline principle is treated by J. Sell in an article "Microprogramming in the Hewlett-Packard 3000", which also is part of said Infotech-Report 23. This article also describes a branching technique in connection with instruction performance, which is based upon two successively arranged instruction word registers according to the pipeline principle.

SUMMARY OF THE INVENTION

According to the present invention, the characteristics of which appear from the claims, a branching apparatus is proposed which is based upon parallel arranged word registers and bit group registers and by means of which branching apparatus the mentioned performance overlappings and information buffer-storings are achieved in addition to an effective branching of an information flow without using too many timing periods, too long words and without wasting hardware.

BRIEF DESCRIPTION OF THE DRAWING

The presently preferred embodiment of the invention will be described more in detail with reference to the accompanying drawing wherein

FIG. 2 is a table used in explaining the operation of the system shown in FIG. 1;

FIG. 4 shows a table concerning an instruction sequence including a linked jump for the embodiment of FIG. 3.

THE PREFERRED EMBODIMENT OF THE INVENTION

Figure 1:
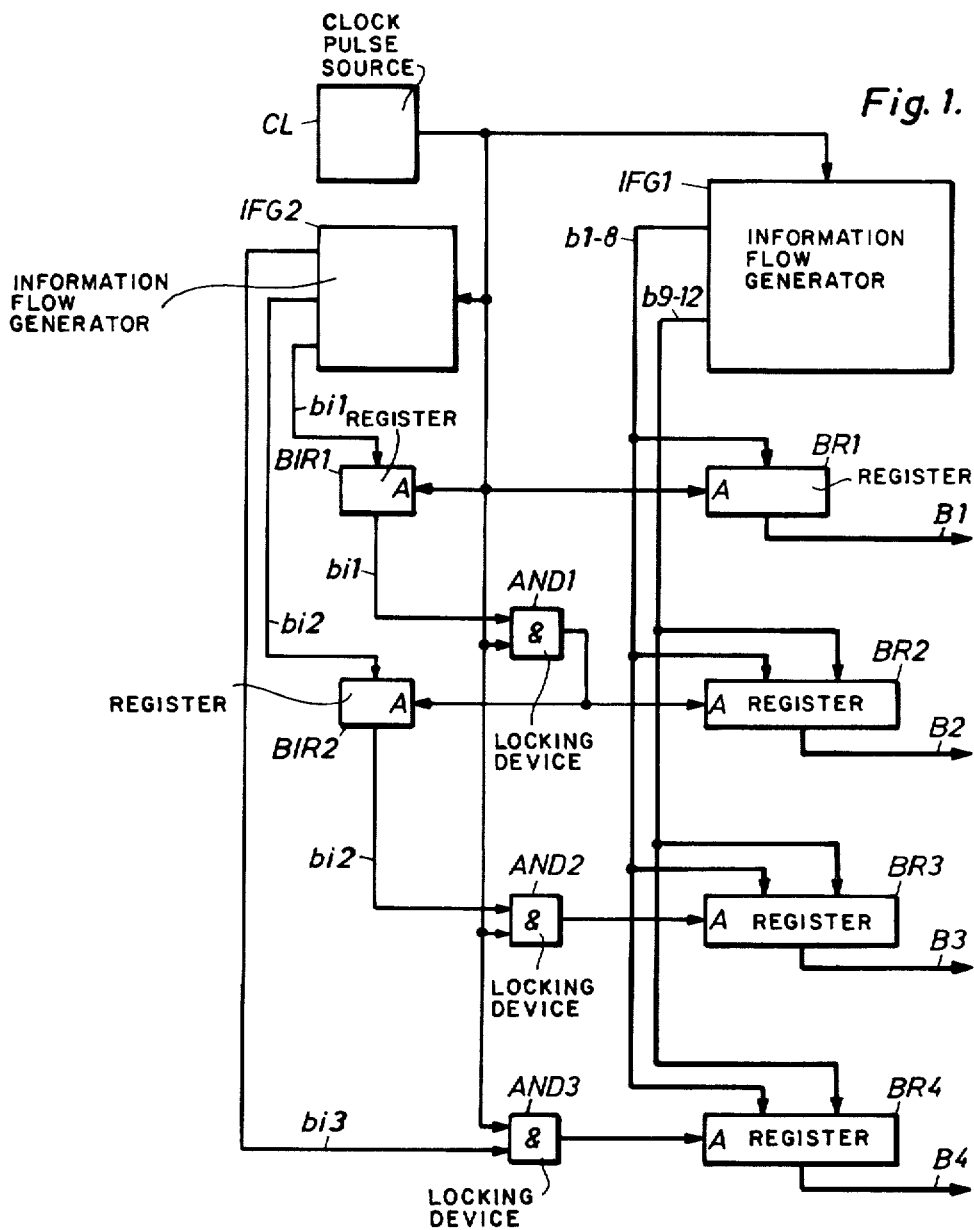
FIG. 1 shows the main principle of the invention in a block diagram.

FIG. 1 shows a first information flow generator IFG1, for example a micro program generator which generates an information flow at a rate which is obtained from a clock pulse source CL. The flow consists of digital words being divided into bit groups b1-8 and b9-12. The information flow is branched into 4 outgoing information flow branches B1 to B4 by means of 4 word registers and bit group registers BR1 to BR4 each being provided with an activation input A. It is assumed that the flow branch B1 only transfers the bit group B1-8 via the bit group register BR1 and that the flow branches B2 to B4 transfer whole words via the word registers BR2 to BR4. The transfers are carried out by means of clock pulses from said clock pulse source CL, with the branchings requiring one timing period each. However, only the bit group register BR1 is directly activated by the clock pulse source so that all the bit groups b1-8 of the information flow arrive to the flow branch B1. The word registers BR2 to BR4 have their activation inputs connected to a respective locking device AND1 to AND3, which performs a logical AND-function between the clock pulses and a branching information bi1 to bi3 generated by a second information flow generator IFG2 at a rate obtained from the clock pulse source. If, for example, the branch information bi3 is constituted by a logical "0" state, which is waiting at the locking device AND3 during the same timing period during which a word of the information flow is waiting at the input of the word register BR4, then at first hand this word is excluded from a branching into the flow branch B4 and at second hand the word being previously registered in the word register BR4 has a prolonged duration on the flow branch B4. Only the locking device AND3 is directly connected to the second information flow generator IFG2 while the locking devices AND1 and AND2 receive the branching information bi1 and bi2 via a branching information register BIR1 and BIR2 each being provided with an activation input A. The mentioned branching information register BIR1 is activated by all clock pulses while the activation input of the branching informatiion register BIR2 is controlled in the same way as the mentioned word registers BR2 to BR4 i.e. via an associated locking device. Then, of course, register BIR2 is not allowed to be controlled by the locking device AND2 which is connected to the output of the branching information register BIR2. According to FIG. 1 the locking device AND1 is used at the same time in order to prolong the duration of a word being branched into the flow branch B2 as well as to prolong a branch information bi2 to control the flow branch B3. Logically it is allowed to combine the bit group register BR1 with the branching information register BIR1 and to combine the word register BR2 with the branching information register BIR2, because their respective activation inputs are directly interconnected.

Functionally the proposed arrangement according to the invention offers a great number of possibilities for information branching which according to known branching principles would require more time and hardware. According to the pipeline principle, a branching information register causes a delay before the branching information generated by the other information flow generator reaches the associated locking device. This delay of one timing period sometimes gives an advantageous adjustment of the time of the branching information to the information flow coming from the first information flow generator as will be described below.

These branching possibilities being offered by means of an arrangement according to FIG. 1 will be further described with the aid of the table of FIG. 2. In the table, the successive lines show states during successive timing periods. It is assumed that the first information flow generator IFG1 generates successive words which are designated 10, 11, 12 and so on, and that the second information flow generator IFG2 furthermore synchronously generates logical "0" and "1" states as branching information bi1, bi2 and bi3. With "x" is is shown that the respective state may be "0" or "1" without influencing the branching result. It is obtained that in the branching information registers BIR1 and BIR2 the branching information bi1 and bi2 respectively is registered which had been generated by the second flow generator during the previous timing period, but if the branching information register BIR1 contains "0" the branching information register BIR2 maintains its state. FIG. 2 does show that the bit group register BR1 according to FIG. 1 only transfers the bit group b1-8 but shows that the branching into the flow branch B1 continues in a continuous sequence of numbers according to the pipeline principle. Furthermore it is shown that the duration of the words in the flow branches B2, B3 respectively is prolonged due to a "0" state in the branching information register BIR1, BIR2 respectively, and that the words in the flow branch B3 is prolonged due to the "0" state of the branching information bi3 coming directly from the second flow generator. In order to easier understand the branching control FIG. 2 contains some association symbols. It is for example indicated that the duration of the word being designated 12 of the flow branch B2 is prolonged due to a "0" state of the branching information register BIR1.

Figure 3:
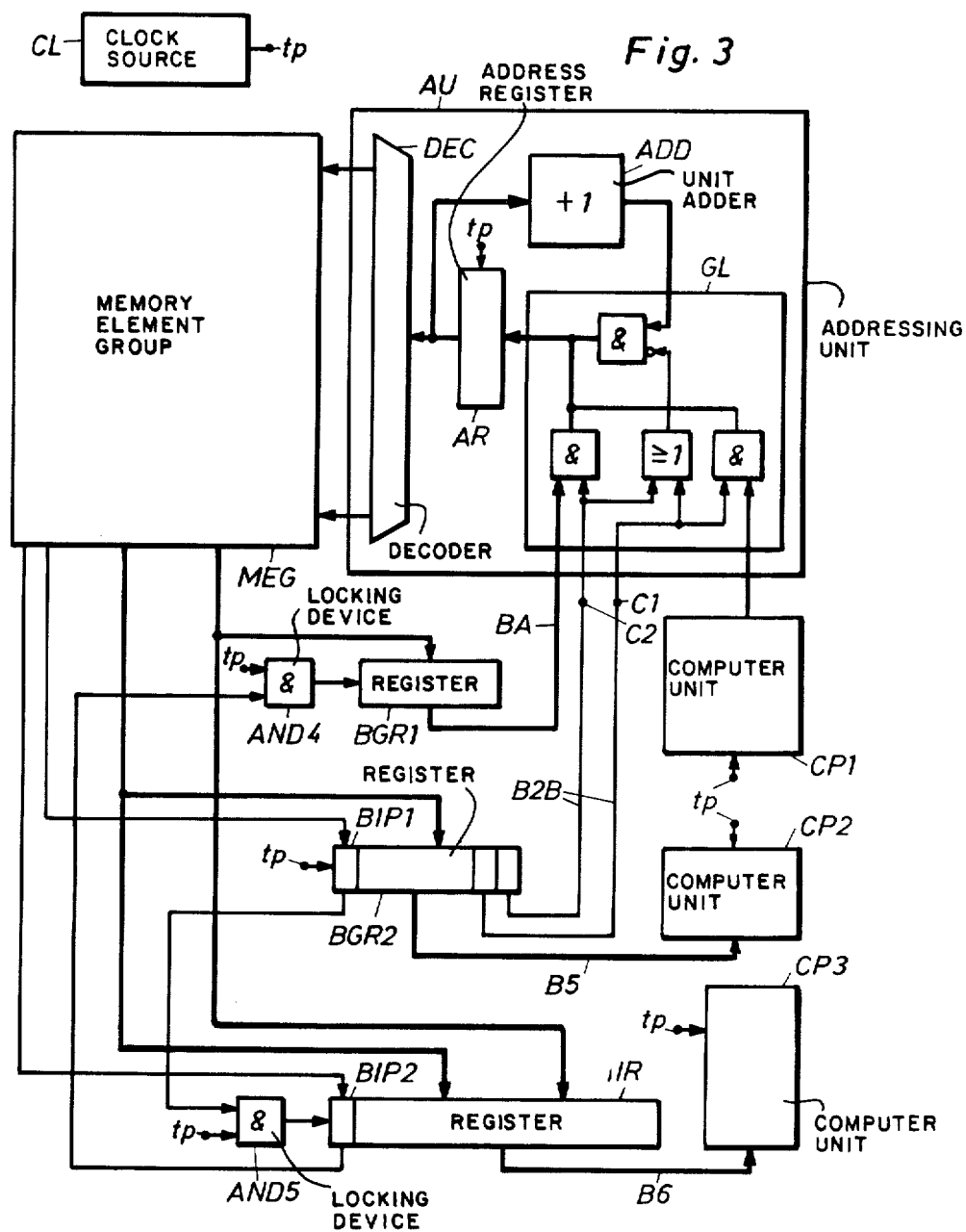
FIG. 3 shows an actual embodiment of the invention.

FIG. 3 shows an embodiment of the proposed branching arrangement which belongs to the computer of a stored program controlled system. The stored program control includes the performance of an instruction sequence which is stored in an instruction memory arrangement. Main and subsequences with jump and rejump instructions occur. The above-mentioned first and second flow generators are then constituted by memory element groups MEG to store the instruction sequence as well as the branching information associated with each instruction. The memory element groups are addressed one at a time for reading by means of an addressing unit AU, the address register AR of which has its activation input connected to a clock pulse source CL. The addresses which, via a decoder DEC and the memory element groups, are converted by pipeline timing to the instruction sequence and to the branching information sequence, are received by the address register via a gate logic GL either from a first unit CP1 included in the computer, for example a data memory, to select the beginning of a main sequence, or from a +1-adder ADD, the input of which is connected to the output of the address register, in order to achieve successive addresses, or from an address flow branch BA to select the beginning of a subsequency and that instruction with which the main sequence continues after the performance of the subsequence. The mentioned gate logic has its control inputs C1 and C2 connected to a two bit flow branch B2B. If an "1"-state is fed to the control input C1 and respectively C2, the address register is connected to the mentioned computer part CP1 and address flow branch BA respectively. If both control inputs C1 and C2 obtain a "0"-state the address register AR is connected to the mentioned +1-adder ADD. The instruction sequences being read from the memory element groups MEG are branched, not only into flow branches BA and B2B, but also, via the other two branches B5 and B6, to units CP2 and CP3 included in the computer. These units can be further memory or processing units.

The branching arrangement shown in FIG. 3 comprises a first bit group register BGR1, the activation input of which is connected to a locking device AND4 and the output of which is connected to said address flow branch BA; a second bit group register BGR2, the activation input of which is directly connected to the clock pulse source CL and the outputs of which are connected to said flow branches B2B and B5; and an instruction register IR, the activation input of which is connected to a locking device AND5 and the output of which is connected to said flow branch B6. The mentioned second bit group register BGR2 includes a position BIP1, which receives a unit of branching information from the memory element groups MEG and sends it to the locking device AND5. The mentioned instruction register IR includes a position BIP2 which receives a second unit of branching information from the memory element groups MEG and sends it to the locking device AND4. A comparison between FIG. 1 and FIG. 3 shows a functional correspondence between the registers BIR1+BR1 in FIG. 1 and BGR2 in FIG. 3, between the registers BIR2+BR2 in FIG. 1 and IR in FIG. 3, between the registers BR3 in FIG. 1 and BGR1 in FIG. 3, and between the locking devices AND1 AND2 in FIG. 1 and AND5 AND4 respectively in FIG. 3.

FIG. 4 is a table which shows how, by means of the embodiment according to FIG. 3, a stored program control is achieved. The addressing sequence is: A first main sequence, the two last instructions of which are designated by (46) and (47), is finished by means of associated addresses 46 and 47. A second main sequence having the instructions (20) to (29) is started by means of an associated starting address 20 and some successive address increases. Address 23 belongs to a jump instruction (23) comprising a jump address 90 to select the beginning of a subsequence comprising the instructions (90) to (95) with associated addresses 90 to 95. Address 24 belongs to a return instruction (24) comprising a return address 26 to select the instruction (26) with which the second main sequency shall continue after the performance of the subsequence. The second main sequence is completely performed by means of successive address increases to address 29. A third main sequence is started by means of an associated starting address 50.

For the associations concerning the addressing and the storing of an instruction and an allotted branching information the following is valid: A "0"-state which is registered in the branching information position BIP1 results in a prolongation of the instruction being registered simultaneously according to the pipeline principle in the instruction register IR and being branched into the flow branch B6, and in a prolongation of the logical state being registered in the branching information position BIP2 to control the locking device AND4. In order to obtain a transition between the main sequences without a timing period loss a "1"-state is fed to said control input C1 of the addressing unit AR by means of the last but one instructions (46) and (28) respectively of the main sequences. Furthermore, the connections are such that the branching information position BIP2 obtains, together with the jump instruction (23) and its previous instruction (22), a "1"-state to have the mentioned addresses 90 and 26 branched into the address flow branch BA, and such that the position BIP2 obtains, together with the return instruction (24) and the instructions (90) to (95) of the subsequence, a "0"-state in order to have the return address 26 buffer-stored. In order to feed the address register with the jump address 90 and the return address 26 respectively without timing period loss, a "1"-state is fed to the control input C2 of the addressing unit by means of the jump instruction (23) by means of the last but one instruction (94) of the subsequence. In order to easier understand the branchings being performed by means of the embodiment according to FIG. 3, FIG. 4 contains some association symbols, for example it is indicated how the address register obtains the return address 26 from the address flow branch BA by means of an "1"-state of the control input C2.

We claim:

1. Information processing apparatus comprising: a source of clock pulses; source means for generating a flow of digital information words and a flow of pluralities of digital braching bits, the flow being synchronized with the clock pulses; a plurality of information word registering means connected to said source means for receiving at least parts of the digital information words therefrom in response to the clock pulses; a plurality of clock pulse synchronized locking means coupled to the plurality of information word registering means, each of said locking means receiving the branching bits and generates an enabling signal for controlling the receipt of said at least parts of the digital information words by an associated information word registering means; a first branching bit registering means connected to said source means for receiving branching bits therefrom, in response to clock pulses, and connected to the associated locking means for emitting thereto the pluralities of digital branching bits for controlling the associated information word registering means to receive the digital information words; and a second branching bit registering means connected to said source means for receiving branching bits therefrom, in response to said enabling signals other than the clock pulse, and connected to the associated locking means for emitting thereto the pluralities of digital branching bits.

* * * * *